March 16, 1954  J. DAUBERSY  2,672,413
METHOD OF MANUFACTURING STEEL BY BLOWING THE MOLTEN IRON
Filed March 12, 1951
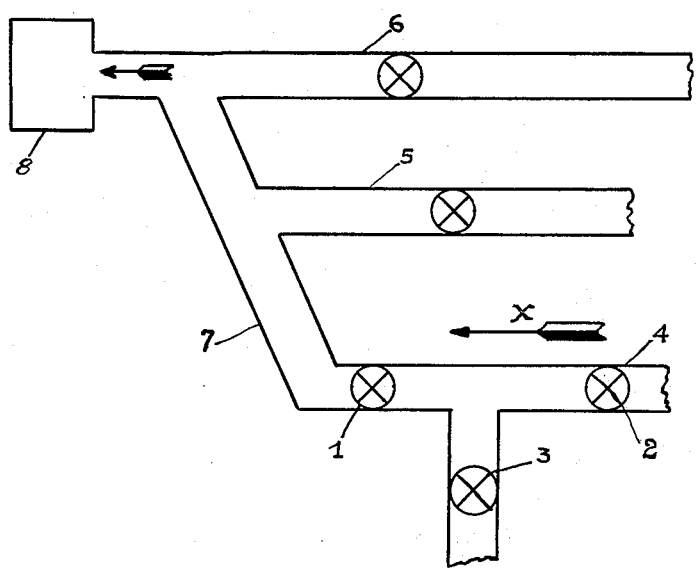
Inventor:
Jean Daubersy
Watson, Cole, Grindle & Watson
Attys.

Patented Mar. 16, 1954

2,672,413

UNITED STATES PATENT OFFICE 2,672,413

METHOD OF MANUFACTURING STEEL BY BLOWING THE MOLTEN IRON

Jean Daubersy, Seraing, Belgium, assignor to Pierre Coheur, Liege, Belgium

Application March 12, 1951, Serial No. 215,058

4 Claims. (Cl. 75—60)

A known method of manufacturing steel consists in subjecting the molten iron to blowing in converters in order to eliminate certain harmful elements.

In this method of preparing steel the regulation of the evolution of heat plays a fundamental part, the importance of which increases considerably, more especially in the case of conversion according to the Thomas method and in methods of blowing with a blast enriched in oxygen.

An excessive conversion temperature presents disadvantages such as considerable fixing of nitrogen in the bath. In the Thomas method, a high temperature renders it impossible to effect forced dephosphorisation without impairing the quality of the metal.

The usual method for maintaining a suitable temperature level consists in regulating the intake of scrap iron. Although this method is particularly economical in the sense that it enables most of the excess heat units to be absorbed by being used for melting the scrap iron, in practice it is incapable of ensuring precise regulation of the temperature. The apparatus used heretofore does not enable continuous intake of scrap iron to be effected, and on the other hand the cooling action of the scrap iron is subject to considerable delay, which varies with the dimensions of the scrap iron.

This invention relates to a method of manufacturing steel by blowing the molten iron and consists in injecting water vapour into the blast.

The cooling action of the water vapour, resulting from the endothermic decomposition thereof into its constituent elements, oxygen and hydrogen, on contact with the bath, is particularly efficacious and rapid.

In the case of blowing with atmospheric air the operation is effected, according to the invention, in such a way as to provide an excess of heat units by keeping the intake of scrap iron a little below its normal rate, that is to say a little below the quantity normally necessary. As soon as the temperature of the bath tends to rise above the level decided upon, cooling is effected by a measured injection of water vapour into the blast. The action is immediate.

The method is particularly simple, and the cost of the installations required for its application is negligible. The amount of water vapour used is so small that its effect on the cost price of the steel is practically inconsiderable. Moreover, the blast produced by the blowers is normally at a sufficiently high temperature to be capable of containing, in a vaporised state, far greater quantities of water than those needed for the application of the invention.

Regulation of the injection of vapour, that is to say, regulation of the quantity injected, may be effected according to the operator's estimation of the temperature by sight. It will be more accurate, and can be rendered more or less automatic, if a pyrometer is available for measuring the temperature of the bath or of the flames. Additionally, and independently of the above-mentioned advantages inherent in the maintenance of an optimum temperature, the injection of water vapour presents other advantages, which depend on the quantity of water vapour injected. For instance one may mention the addition of an extra quantity of oxygen arising from the decomposition of the water, and resulting in reduction of the blowing time, and the addition of hydrogen, from the same source, which reduces the partial pressure of nitrogen in the fumes, thus causing an additional reduction of the amount of nitrogen in the bath.

An alternative form of the invention consists in the application of the method to the case in which blowing is effected by means of air enriched in oxygen. With the enriched blast, it appears at first sight unnecessary to have recourse to water vapour as a means of regulating the temperature, the addition of oxygen being in itself capable of effecting this regulation. But this is true only for very moderate oxygen-enrichments of the blast, which do not have a decisive effect on the nitrogen content of the bath. If, with the object of reducing the final nitrogen content of the metal, the oxygen content of the blast is increased even to such an extent that no nitrogen whatsoever is present, then it becomes imperatively necessary to have recourse to strong cooling means.

Considerations of economy would suggest that use be made only of scrap iron or iron oxides and ores, but it is hard to effect continuous intake of these additions. On the other hand, unless carbonates or hydrates are used, they do not produce the gaseous emissions desirable for reducing the partial pressure of the nitrogen remaining in the fumes.

According to the invention, it is recommended that the harshness of the action of the oxygen be reduced by associating water vapour with the oxygen. The advantages resulting from the use of water vapour mixed with the oxygen consist mainly in the moderation at will of the heating of the bath, which is essential for satisfactory conservation of the linings, and has a beneficial effect on the final nitrogen and phosphorus content of the steel, in providing an additional quantity of oxygen and thus reducing the cost of the blast, and in reducing the final nitrogen content of the metal by the combined effects of the diminution of the nitrogen content of the blast and of the dilution of the fumes with hydrogen gases and water vapour arising from the injection of water vapour.

It is to be noted that another agent for diluting the oxygen has already been recommended. This agent is carbon dioxide gas, but water vapour is much more suitable than carbon dioxide gas for the object in view. Actually, if a comparison is made between two mixtures, oxygen and water vapour on the one hand and oxygen and carbon dioxide on the other, these mixtures being in proportions such that they each have the same thermal effect on the converter bath, it will be found that with the same expenditure of oxygen the gaseous emission ($H_2+H_2O$) in the case of the first mixture is much more abundant than the gaseous emission ($CO_2+CO$) in the case of the second mixture.

In addition, the use of water vapour has an essential economic advantage over that of carbonic anhydride in that water is easily and cheaply obtainable, which is not the case with carbon dioxide gas.

According to an additional characteristic of the invention it is recommended that in order to obtain a thermal effect similar to that of atmospheric air the mixture be made such that it contains about 50% by weight, of industrially pure oxygen and 50% of water vapour, but for melting additional quantities of scrap iron the proportion of oxygen in the mixture is increased. Thus for instance mixtures with oxygen concentrations amounting to 60% by weight may be used with advantage.

Another characteristic of the method provides for the use of steam superheated up to about 250° centigrade. This avoids the risk of condensation of the steam on contact with the oxygen and the dangers inherent in such condensation.

The injection of the vapour is preferably effected by a device with three valves eliminating all risk of condensation of the vapour from the blast box except at the time of injection.

This device, which is illustrated diagrammatically in the accompanying drawing, comprises an arrangement in the form of a T, each of the three branches of which is provided with a valve 1, 2 and 3 respectively, for the introduction of vapour which is effected through the duct 4 as indicated by the arrow X. Oxygen and air are passed to the converter 8 through the ducts 5 and 6 respectively.

The device operates as follows: Before the addition of the vapour, the valve 1 is closed, the valves 2 and 3 are open.

Any vapour which may have condensed in the duct above the valve 2 is expelled. In order to effect injection, the valves 1 and 2 are opened and the valve 3 is closed. Immediately after injection, the valve 2 is closed and the valves 1 and 3 are opened. The blast expels any water vapour which may have been deposited below the valve 1.

The valves 1 and 2 are then closed and the valve 3 is opened, which removes all possibility of return of vapour and deposition of water in the blast boxes during suspension of operation, and consequently removes the dangers of explosion.

As regards the moment of injection, it has been found that a blast consisting of a mixture composed only of pure oxygen and water vapour may advantageously be used for some moments before dephosphorisation and up to the final phase of conversion. It is obvious that this mixture may be blown in for a longer or shorter time, and even during the entire duration of the conversion, depending on the importance attached to the diminution of the final nitrogen content of the steel.

I claim:
1. A method for the manufacture of steel by blowing molten iron in a converter, comprising at least one final conversion period during which the blowing is effected exclusively and continuously with a mixture of oxygen and superheated steam of about 250° C. and the control of the conversion is effected by the regulation of the proportions of the constituents of said mixture of oxygen and superheated steam in order to maintain its thermal effect at least in correspondence with that of the atmospheric air.

2. A method of manufacturing steel by blowing molten iron in a converter, comprising at least one final conversion period during which the blowing is effected exclusively and continuously with a mixture of oxygen and superheated steam of about 250° C., said steam being present in a proportion of about 50% by weight of the mixture of oxygen and superheated steam blown into the converter.

3. A method of manufacturing steel by blowing the molten iron in a converter, comprising at least one final conversion period during which the blowing is effected exclusively and continuously with a mixture of oxygen and superheated steam of about 250° C., said steam being present in a proportion of less than about 50% by weight of the mixture of oxygen and superheated steam blown into the converter.

4. For use in a method of manufacturing steel by blowing the molten iron while in a converter, an apparatus comprising a converter, a conduit connected at one end to the converter and at the other end to a source of atmospheric air, an air inlet valve in said conduit, a second conduit opening into said first conduit between said valve and the converter, separate oxygen and steam conduits opening into said second conduit, inlet valves in said oxygen and steam conduits, a valved discharge conduit connected to said steam conduit between the inlet valve therein and said second conduit, and a valve between said second conduit and said discharge conduit, whereby when said oxygen inlet valve is closed, and by manipulation of said other valves, any condensate in said steam conduit may be blown out through said discharge conduit either by steam or by atmospheric air.

JEAN DAUBERSY.

References Cited in the file of this patent

UNITED STATES PATENTS

| Number | Name | Date |
|---|---|---|
| 277,929 | Reese | May 22, 1883 |
| 2,333,654 | Lellep | Nov. 9, 1943 |
| 2,456,798 | Slick | Dec. 21, 1948 |
| 2,467,647 | Alexander | Apr. 19, 1949 |
| 2,485,305 | McFeaters | Oct. 18, 1949 |
| 2,529,387 | Haglund | Nov. 7, 1950 |
| 2,575,724 | McIntosh | Nov. 20, 1951 |

FOREIGN PATENTS

| Number | Country | Date |
|---|---|---|
| 59 | Great Britain | of 1865 |
| 583,775 | Great Britain | Dec. 30, 1946 |

OTHER REFERENCES

Making, Shaping, and Treating of Steel, 5th Edition, page 370. Edited by Camp and Francis. Published in 1940 by the Carnegie-Illinois Steel Corp., Pittsburgh, Pa.